United States Patent
Lin

(10) Patent No.: US 9,554,036 B1
(45) Date of Patent: Jan. 24, 2017

(54) PORTABLE ELECTRONIC DEVICE WITH SHUTTER BUTTON FOR IMAGE CAPTURE, AND CONTROL METHOD THEREOF

(71) Applicant: HTC Corporation, Taoyuan (TW)

(72) Inventor: Yi-Hsin Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/825,995

(22) Filed: Aug. 13, 2015

(51) Int. Cl.
*H04N 5/232* (2006.01)

(52) U.S. Cl.
CPC ...... *H04N 5/23222* (2013.01); *H04N 5/23206* (2013.01); *H04N 5/23216* (2013.01); *H04N 5/23293* (2013.01)

(58) Field of Classification Search
CPC .............................................. H01H 2003/085
See application file for complete search history.

(56) References Cited

U.S. PATENT DOCUMENTS

| | | | | |
|---|---|---|---|---|
| 1,947,282 | A * | 2/1934 | Theis | E05B 5/003 200/341 |
| 6,683,653 | B1 * | 1/2004 | Miyake | H04N 1/2158 348/373 |
| 8,001,488 | B1 * | 8/2011 | Lam | G06F 3/0238 345/156 |
| 2004/0204145 | A1 * | 10/2004 | Nagatomo | H04L 12/5895 455/566 |
| 2005/0034967 | A1 * | 2/2005 | Huber | G05G 1/02 200/566 |
| 2013/0076681 | A1 * | 3/2013 | Sirpal | G06F 3/1438 345/173 |
| 2014/0139486 | A1 * | 5/2014 | Mistry | G06F 3/0304 345/175 |

* cited by examiner

*Primary Examiner* — Clayton E Laballe
*Assistant Examiner* — Noam Reisner
(74) *Attorney, Agent, or Firm* — Birch, Stewart, Kolasch & Birch, LLP

(57) ABSTRACT

A portable electronic device equipped with a camera module and a shutter buffer and a control method using the same. The shutter button is switchable between multiple stages and includes a display screen. A control circuit of the portable electronic device operates the camera module and provides display content to the display screen based on the switch between the multiple stages of the shutter button.

16 Claims, 11 Drawing Sheets

PORTABLE ELECTRONIC DEVICE WITH SHUTTER BUTTON FOR IMAGE CAPTURE, AND CONTROL METHOD THEREOF

BACKGROUND OF THE INVENTION

Field of the Invention

The present invention relates to a portable electronic device equipped with a camera module and how to use the portable electronic device to share the captured image(s) to an online social networking platform.

Description of the Related Art

Online social networking services, such as Facebook, Instagram, Twitter and so on, provide platforms to build social networks or social relations among people who share interests, activities, backgrounds or real-life connections. Online social networking sites allow users to share ideas, pictures, posts, activities, events, and interests with people in their network. Today, many portable electronic devices have been developed to cater to users of the growing number of online social networking services.

BRIEF SUMMARY OF THE INVENTION

A portable electronic device equipped with a camera module and a shutter button is disclosed.

In an exemplary embodiment, the portable electronic device further comprises a control circuit. The shutter button for the camera module is switchable between multiple stages and includes a display screen. The control circuit of the portable electronic device operates the camera module and provides display content to the display screen based on the switch between the multiple stages of the shutter button.

In another exemplary embodiment, a control method for a portable electronic device equipped with a camera module is disclosed. A shutter button is provided on the portable electronic device for the camera module. The shutter button is switchable between multiple stages and includes a display screen. The control method comprises: recognizing the switch between the multiple stages of the shutter button; and operating the camera module and providing display content to the display screen based on the switch between the multiple stages of the shutter button.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments for carrying out the invention. This description is made for the purpose of illustrating the general principles of the invention and should not be taken in a limiting sense. The scope of the invention is best determined by reference to the appended claims.

Figure 1A:
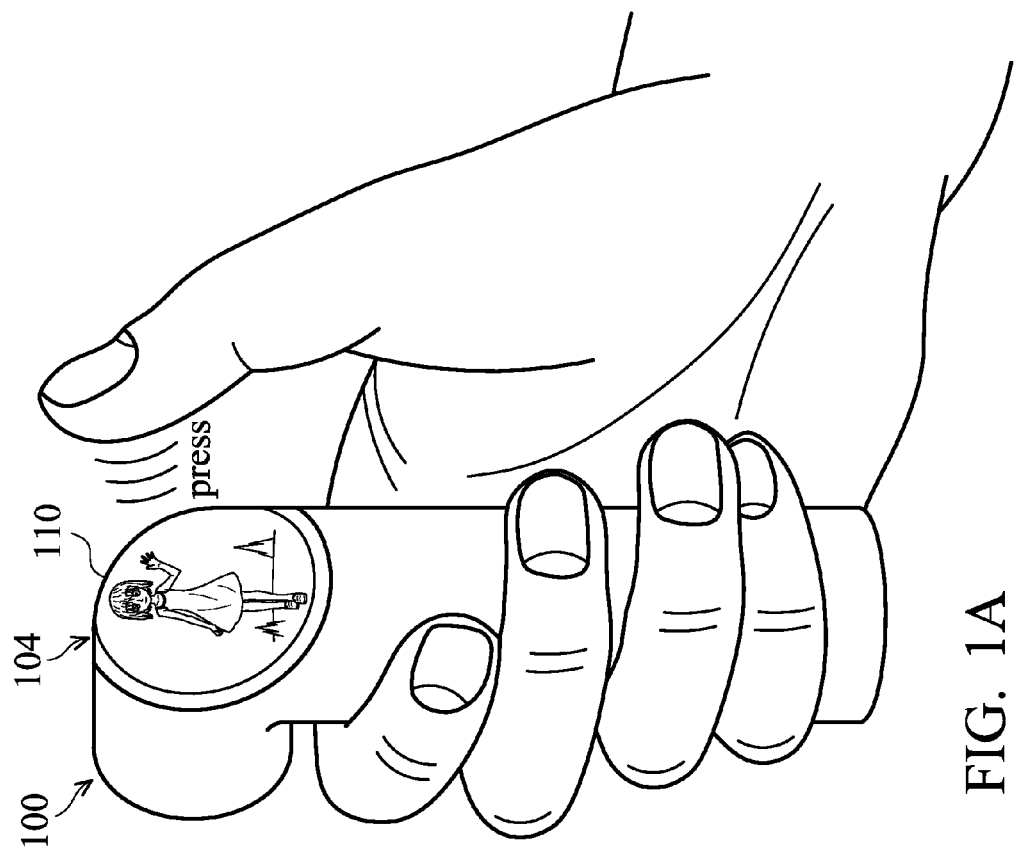
FIG. 1A and FIG. 1B depict a portable electronic device 100 in accordance with an exemplary embodiment of the disclosure.
Figure 1A:
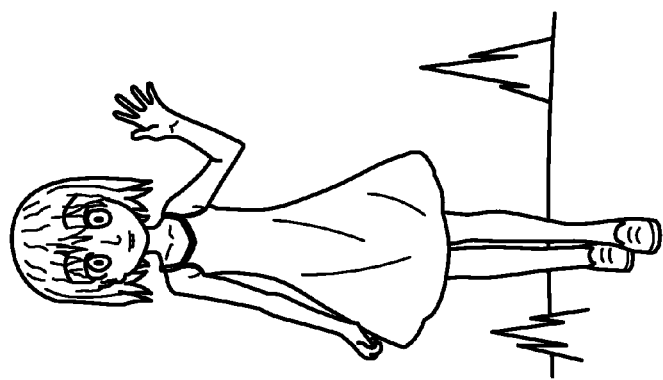
Figure 1B:
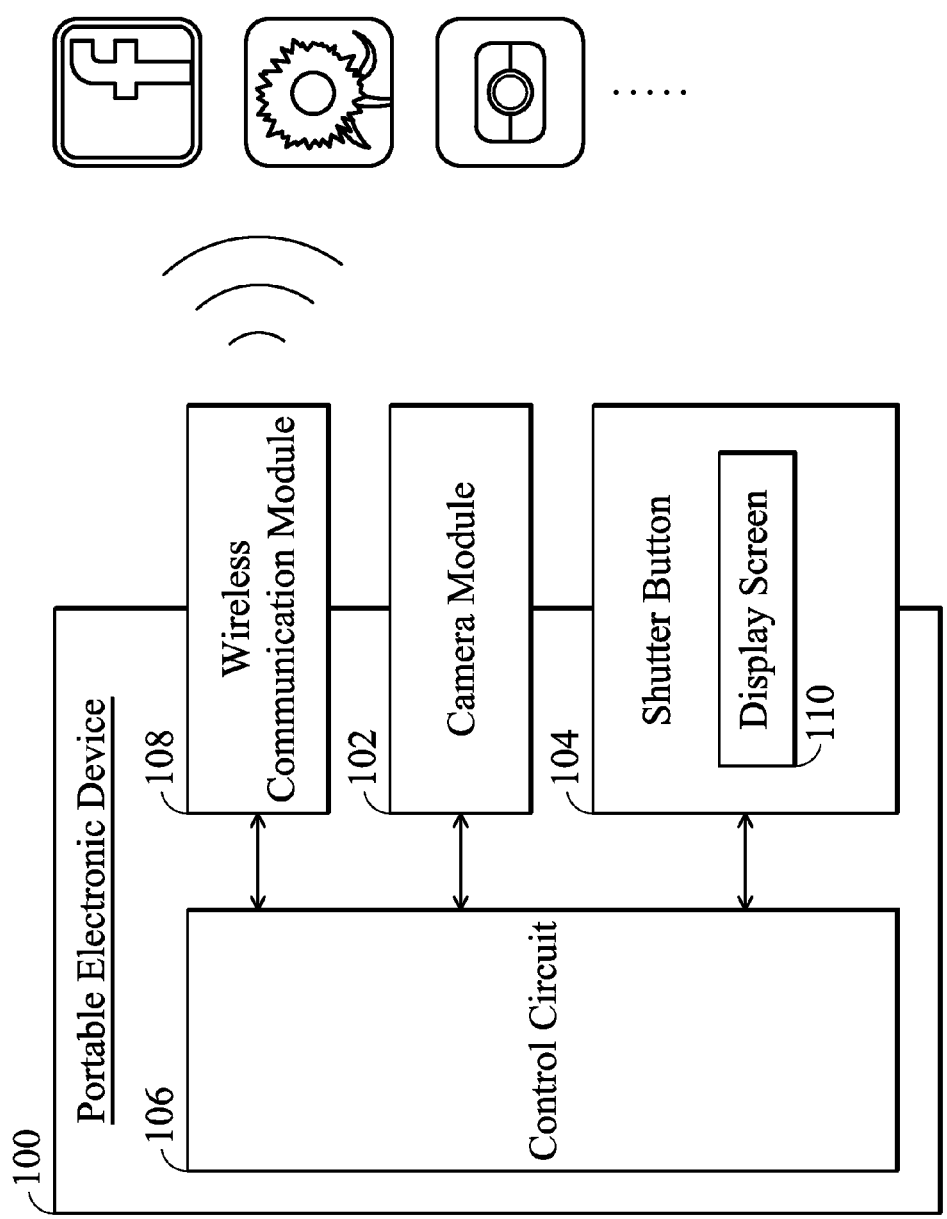

FIG. 1A and FIG. 1B depict a portable electronic device 100 in accordance with an exemplary embodiment of the disclosure, which is equipped with a camera module (numbered 102 in the block diagram of FIG. 1B) and has a shutter button 104, a control circuit (numbered 106 in the block diagram of FIG. 1B) and a wireless communication module (numbered 108 in the block diagram of FIG. 1B). A display screen 110 is assembled atop the shutter button 104. The control circuit 106 operates the camera module 102 and the shutter button 104 for a camera live preview on the display screen 110. During the camera live preview, the camera module 102 takes a picture (e.g., one image) in accordance with a half press shorter than a threshold time on the shutter button 104, and starts taking a video (e.g., a series of images) in accordance with a half press longer than the threshold time on the shutter button 104. The wireless communication module 108 is operated by the control circuit 106 to publish a picture or a video captured by the camera module 102 online. For example, the user may use the portable electronic device 100 to capture a picture or a video and share the captured picture or video online by any online social networking service, such as Facebook, Twitter, Instagram and so on.

In addition to being pressed halfway for image capture, the shutter button 104 is in a mechanical structure that is further mechanically operated by the user for menu selection. The selection between the different pictures or videos captured by the camera module 102 is performed by mechanically operating the shutter button 104. The shutter button 104 is further mechanically operated for an online social network selection to publish a selected picture or a selected video to a selected online social networking platform.

In another exemplary embodiment, menu icons may be alternatively displayed on the display screen 110 by mechanically operating the shutter button 104 for menu selection.

Figure 2:
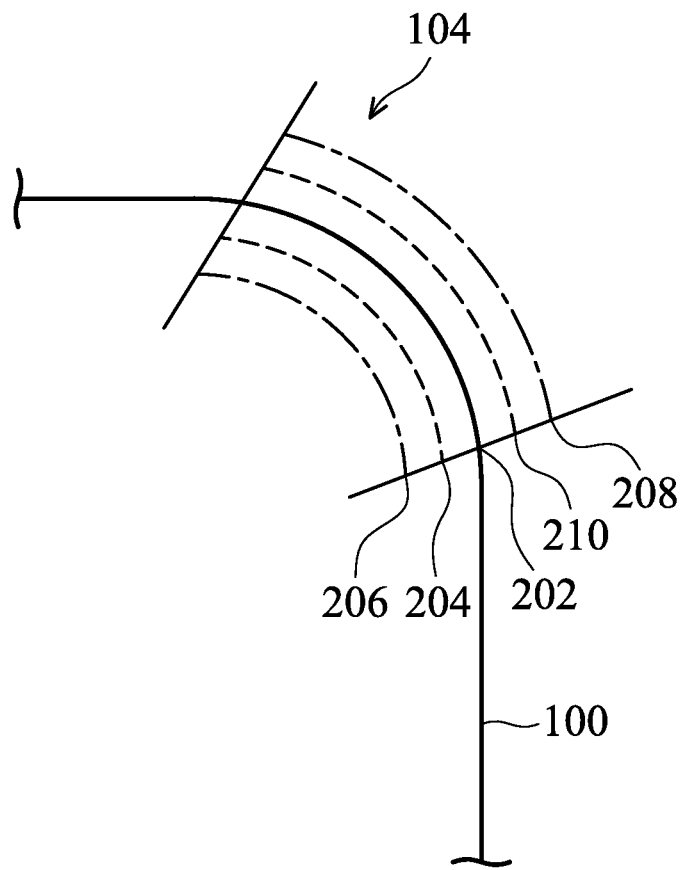
FIG. 2 shows that the shutter button 104 may be switched between a normal state 202, a half depression state 204, a full depression state 206, a protruding control knob state 208, and a half-pressed protruding state 210.

The shutter button 104 may support being pressed in multiple stages. FIG. 2 shows that the shutter button 104 may be switched between the multiple stages including a normal state 202, a half depression state 204, a full depression state 206, a protruding control knob state 208, and a half-pressed protruding state 210.

Figure 3:
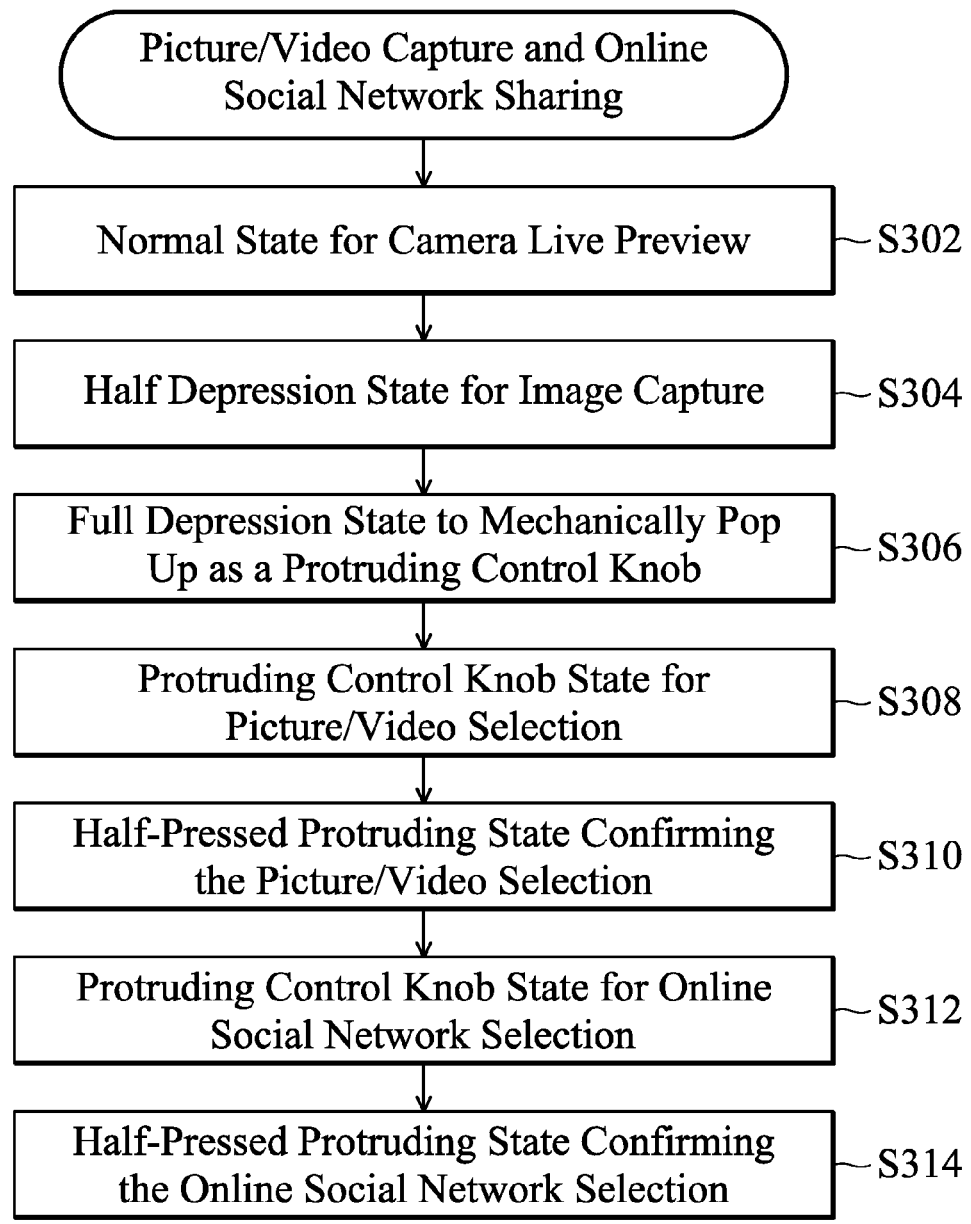
FIG. 3 is a flowchart depicting how the user switches the shutter button 104 between the different states (202 to 210) to take a picture or a video and publish the captured picture or video to an online social networking platform.

FIG. 3 is a flowchart depicting how the user switches the shutter button 104 between the different states 202 to 210 to take a picture or a video and publish the captured picture or video to an online social networking platform. In step S302, the shutter button 104 is in the normal state 202 and the display screen 110 is operated to display the camera live preview. In step S304, the shutter button 104 is pressed halfway to the half depression state 204 for image capture, e.g., taking a picture by a short half press or taking a video in accordance with a long half press. The video capture may start in accordance with one long half press and stop in accordance with another long half press. In step S306, the shutter button 104 is fully pressed to the full depression state 206 to mechanically pop up to the protruding control knob state 208 as a protruding control knob. In step S308, the shutter button 104 in the protruding control knob state 208 is turned by the user for picture/video selection. In step S310, the shutter button 104 is pressed to the half-pressed protruding state 210 to confirm the picture/video selection. In step S312, the shutter button 104 pops up back to the protruding control knob state 208 to be turned by the user for online social network selection. In step S314, the shutter button 104 is pressed to the half-pressed protruding state 210 to confirm the online social network selection and thereby the selected picture or the selected video is published to a selected online social networking platform.

In another exemplary embodiment, the display screen 110 is a touch panel. When the shutter button 104 is in the protruding control knob state 208, the pictures/videos/menu icons alternatively displayed on the display screen 110 is switched by sensing a touching or a turning of the user on the touch panel.

Figure 4B:
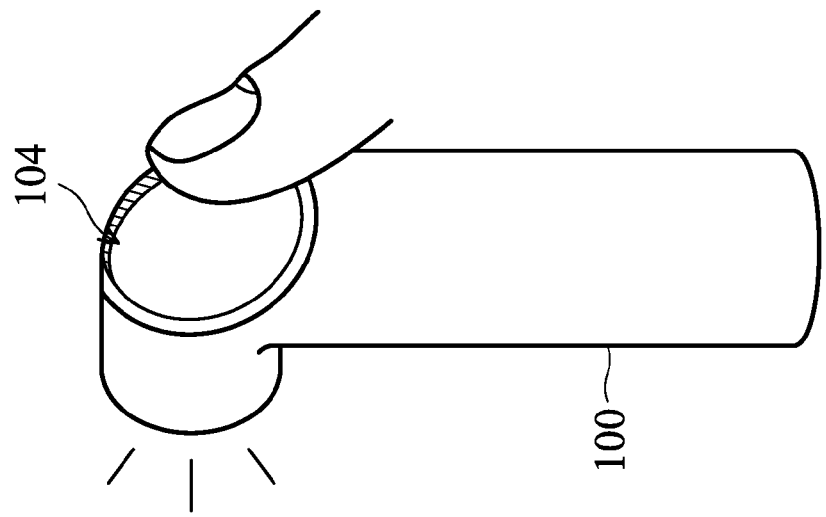
FIG. 4A and FIG. 4B show that the shutter button 104 is pressed halfway to switch the shutter button 104 to the half depression state 204 for image capture.
Figure 4A:
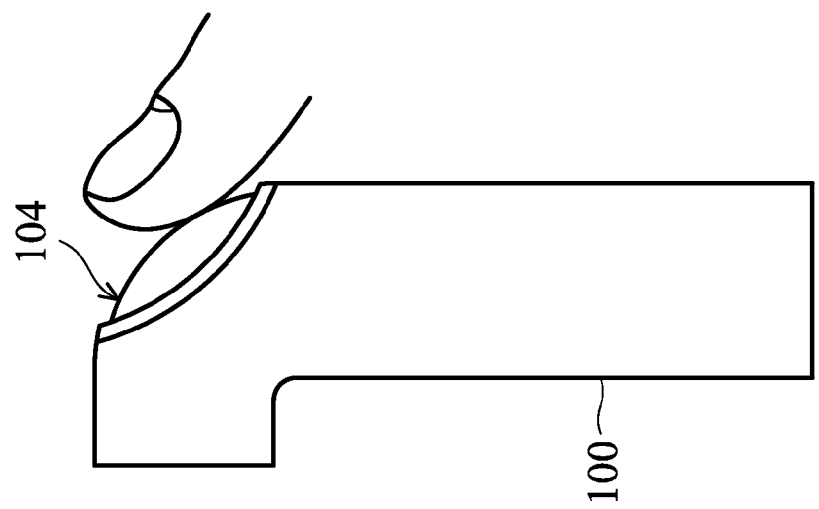
Figure 5B:
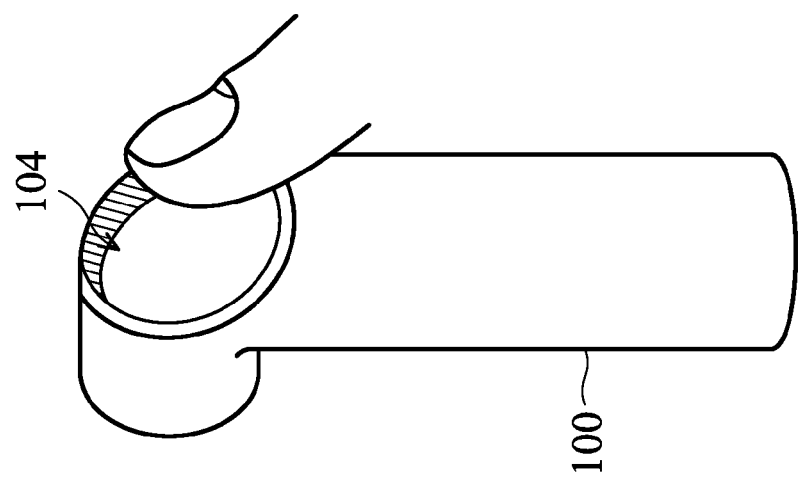
FIG. 5A and FIG. 5B show that the shutter button 104 is pressed deeper (in comparison with the half depression state 204) to switch the shutter button 104 to the full depression state 206 for a counterforce to bounce the shutter button 104.
Figure 5A:
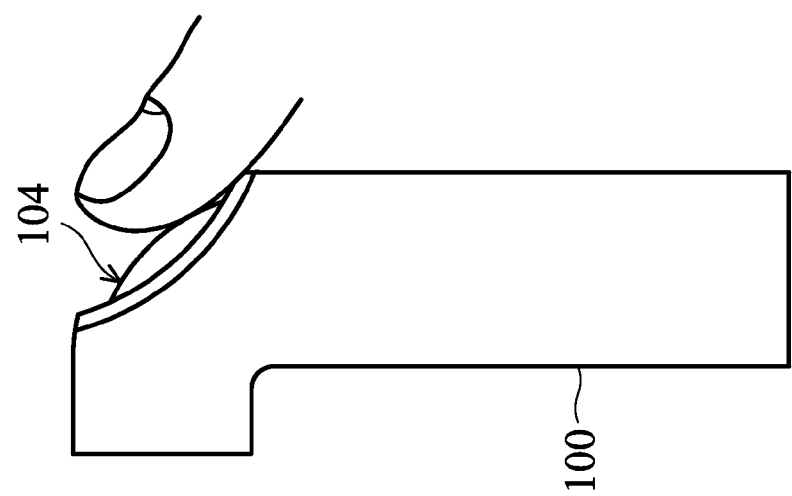
Figure 6C:
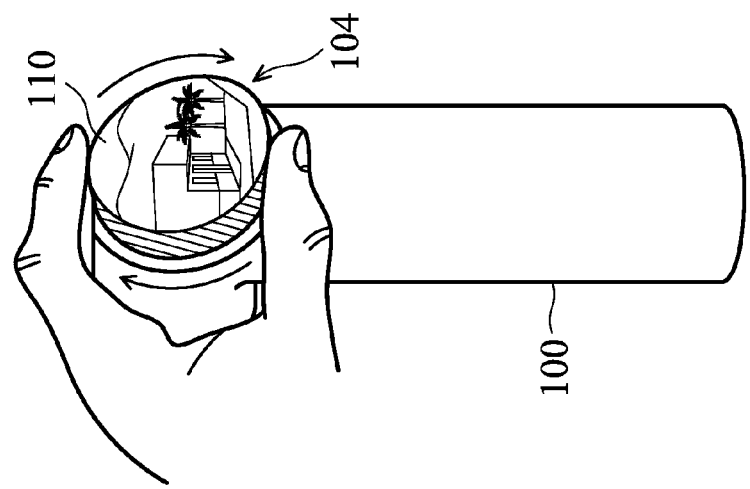
FIG. 6A, FIG. 6B and FIG. 6C show that the shutter button 104 pops up to the protruding control knob state 208 as a protruding control knob.
Figure 6B:
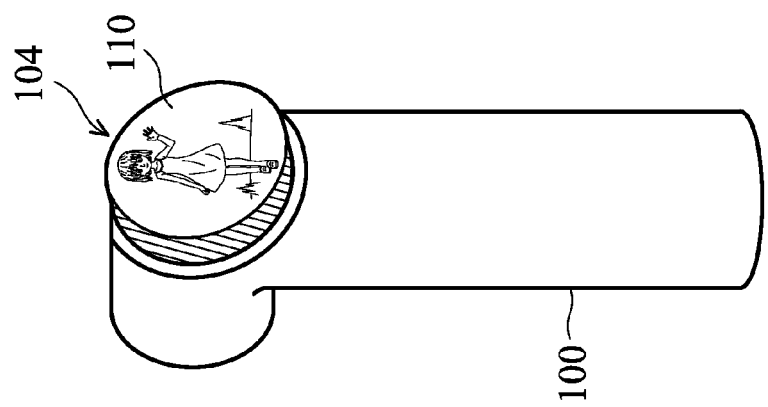
Figure 6A:
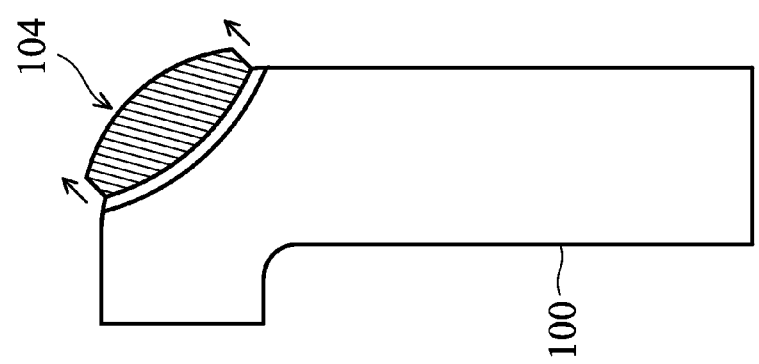
Figure 7B:
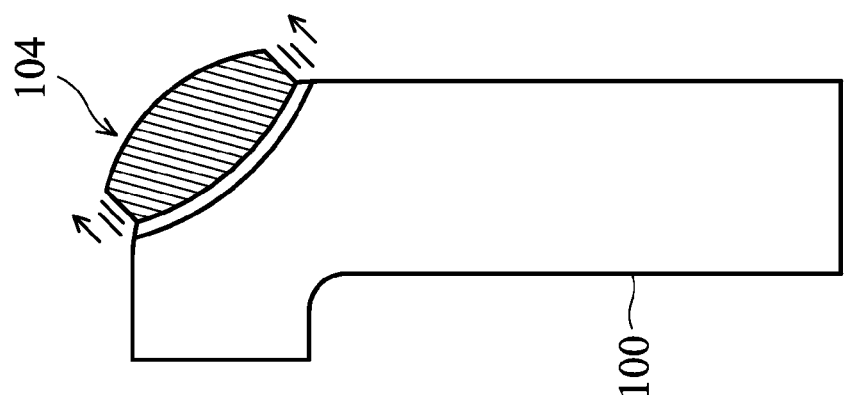
FIG. 7A and FIG. 7B show that the protruding control knob is pressed halfway to switch the shutter button 104 to the half-pressed protruding state 210 and then the protruding control knob state 208 pops up to the protruding control knob state 208 again and a selection is thereby confirmed.
Figure 7A:
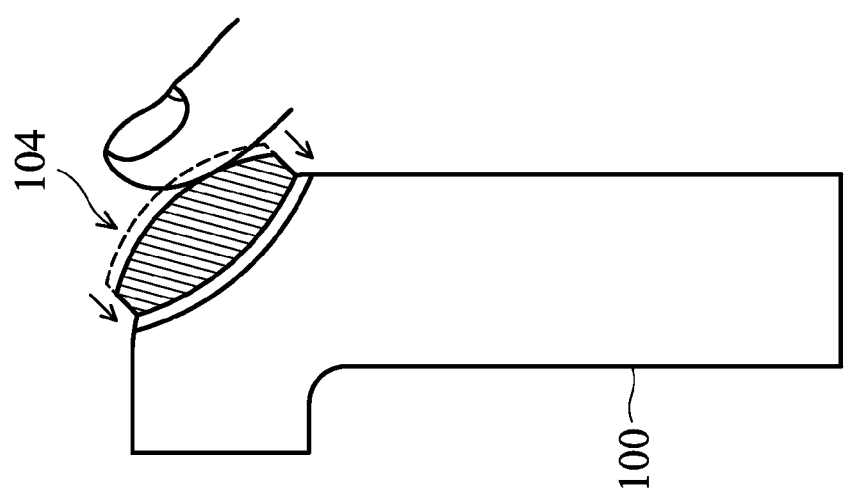

FIG. 4A and FIG. 4B show that the shutter button 104 is pressed halfway to switch the shutter button 104 to the half depression state 204 for image capture. FIG. 5A and FIG. 5B show that the shutter button 104 is pressed deeper (in comparison with the half depression state 204) to switch the shutter button 104 to the full depression state 206 for a counterforce to bounce the shutter button 104. FIG. 6A, FIG. 6B and FIG. 6C show that the shutter button 104 pops up to the protruding control knob state 208 as a protruding control knob. As shown in FIG. 6B, the captured picture may be displayed on the display screen 110 of the shutter button 104. FIG. 6C shows that the user may turn the shutter button 104 (as a protruding control knob) to switch the display screen 110 to display the pictures captured before. FIG. 7A and FIG. 7B show that the protruding control knob is pressed halfway to switch the shutter button 104 to the half-pressed protruding state 210 and then the protruding control knob state 208 pops up to the protruding control knob state 208 again and a selection is thereby confirmed.

Figure 8B:
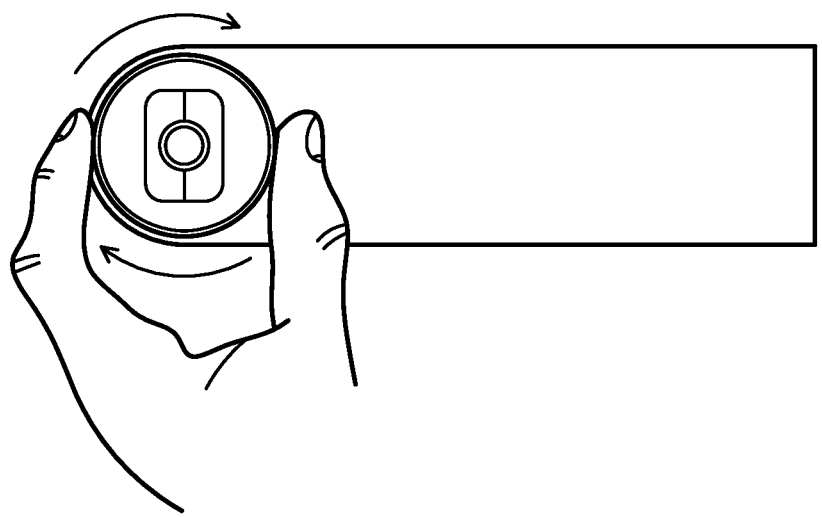
FIG. 8B shows that the user may turn the shutter button 104 (as a protruding control knob) to switch the display screen 110 to display another social networking icon for selection.
Figure 8A:
FIG. 8A shows that after a picture or a video is selected and the shutter button 104 is switched back to the protruding control knob state 208, an online social network icon may be displayed on the display screen 110 of the shutter button 104.

FIG. 8A shows that after a picture or a video is selected and the shutter button 104 is switched back to the protruding control knob state 208, an online social network icon may be displayed on the display screen 110 of the shutter button 104. FIG. 8B shows that the user may turn the shutter button 104 (as a protruding control knob) to switch the display screen 110 to display another social networking icon for selection. To confirm the online social network selection, the user may perform the half press depicted in FIG. 7A and FIG. 7B again.

Figure 9:
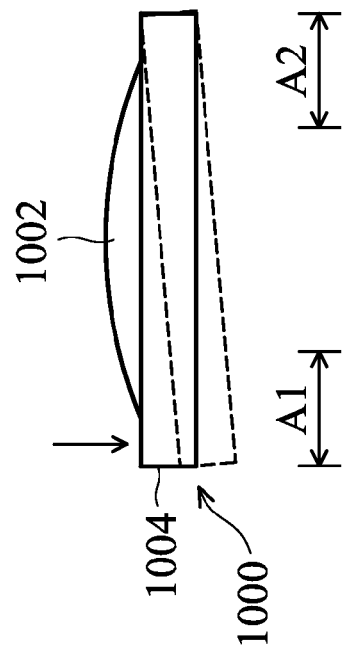
FIG. 9 shows another shutter button 900 comprising a control dial 904 around a display screen 902.

FIG. 9 shows another shutter button 900 comprising a control dial 904 around a display screen 902. The shutter button 900 is not operated as a protruding control knob. Instead, the display screen 902 is switched between showing the different pictures captured by the camera module 102 or switched between showing the different videos captured by the camera module 102 or switched between showing different menu icons (e.g., icons of different online social network services) by turning the control dial 902. The shutter button 900 has a mechanical part supporting the display screen 902, and the mechanical motion of the control dial 904 is independent from the mechanical motion of the mechanical part. The picture or video selection or the online social network selection is confirmed by a half press on the mechanical part. The half press on the mechanical part for the picture or video or online social network selection is shorter than a threshold time. As for a half press on the mechanical part longer than the threshold time, the camera module 102 and the shutter button 900 are operated for the camera live preview on the display screen 902 again.

Figure 10:
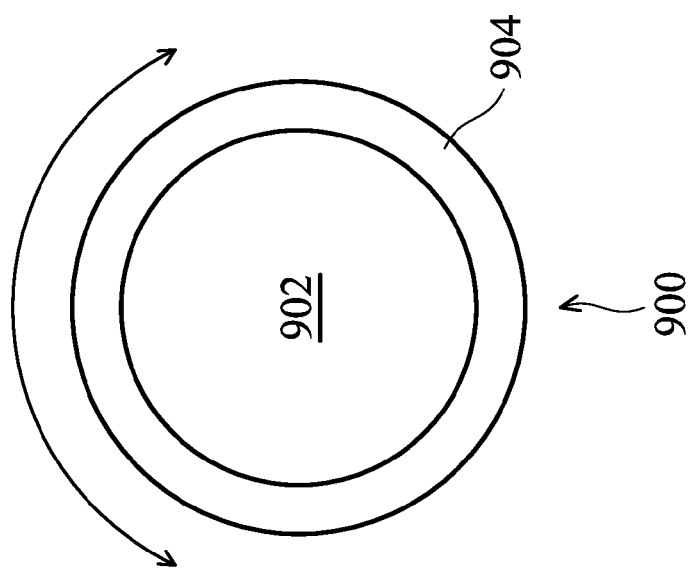
FIG. 10 shows a shutter button 1000 in accordance with another exemplary embodiment of the disclosure.

FIG. 10 shows a shutter button 1000 in accordance with another exemplary embodiment of the disclosure. According to the lateral view in FIG. 10, the shutter button 1000 comprises a display screen 1002 and a control dial 1004 around the display screen 1002. The mechanical motion of the control dial 1004 is independent from the mechanical motion of the mechanical part supporting the display screen 1002. The control dial 1004 supports recognition of a press on the control dial 1004 in area A1. The control dial 1004 sinks in the area A1 with the press on the control dial 1004 in the area A1. The picture or video selection or the online social network selection is confirmed by a press on the control dial 1004 in the area A1. Furthermore, when the control dial 1004 is pressed in area A2, the camera module 102 and the shutter button 1000 may be operated for the camera live preview on the display screen 1002 again.

Figure 11:
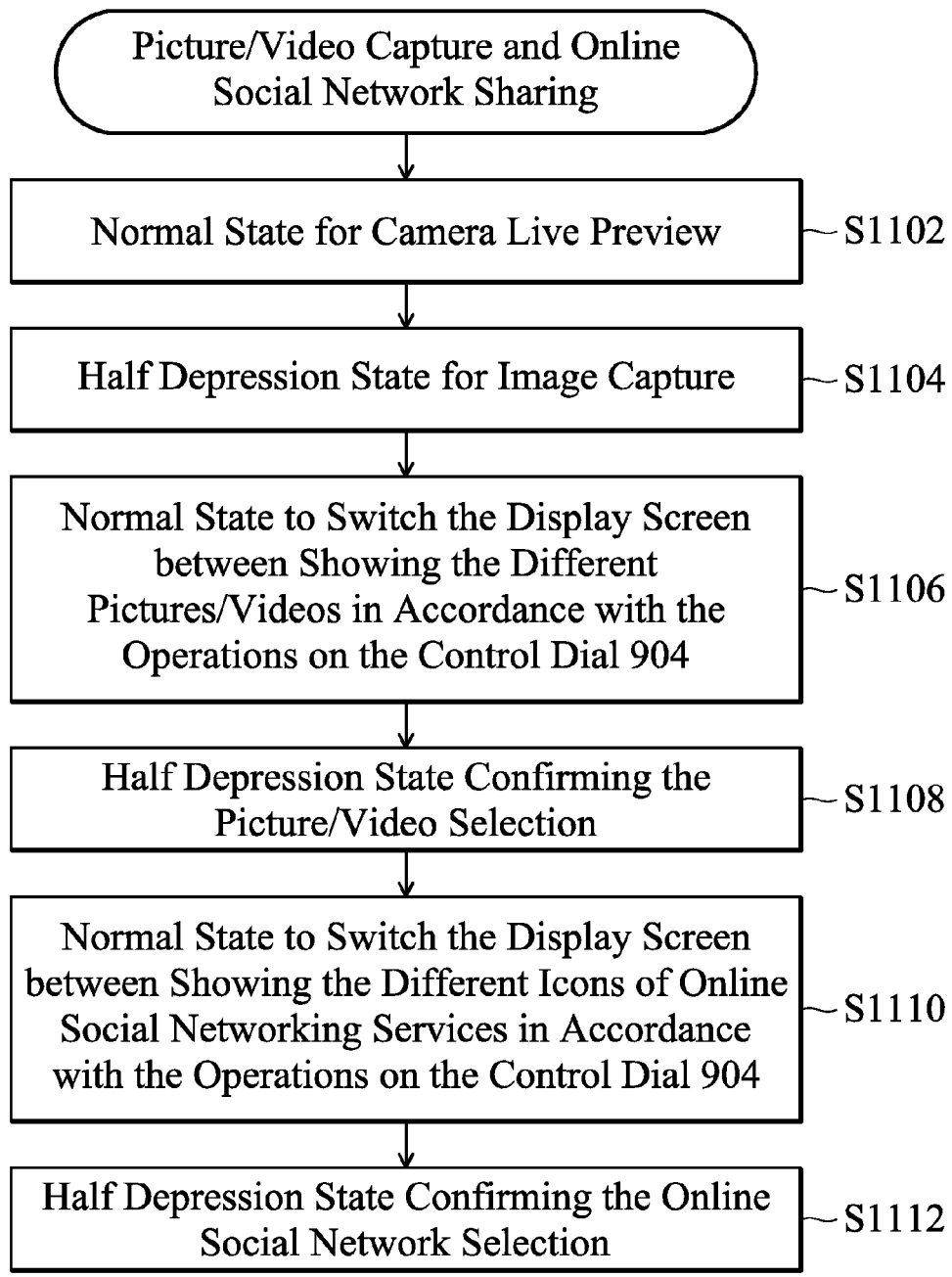
FIG. 11 is a flowchart depicting how the user switches the shutter button 900 between the different states (including the normal state 202 and the half depression state 204) to take a picture or a video and publish the captured picture or video to an online social networking platform.

FIG. 11 is a flowchart depicting how the user switches the shutter button 900 between the different states (including the normal state 202 and the half depression state 204) to take a picture or a video and publish the captured picture or video to an online social networking platform. In step S1102, the shutter button 904 is in the normal state 202 and the display screen 902 is operated to display the camera live preview. In step S1104, the shutter button 900 is pressed halfway to the half depression state 204 for image capture (e.g., taking a picture by a short half press or taking a video in accordance with a long half press). In step S1106, the shutter button 902 pops up to the normal state 202 and the control dial 904 is turned by the user to switch the display screen 902 between showing the different pictures or videos for picture/video selection. In step S1108, the shutter button 900 is pressed to the half depression state 204 to confirm the picture/video selection. In step S1110, the shutter 900 pops up to the normal state 202 and the control dial 904 is turned by the user to switch the display screen 902 between showing the icons of the different online social networking services. In step S1112, the shutter button 900 is pressed to the half depression state 204 to confirm the online social network selection and thereby the selected picture or the selected video is published to a selected online social networking platform. As for the shutter buffer 1000, the picture/video selection and the online social network selection is confirmed by a press on the control dial 1104 in the area A1 rather than a half-press on the display screen (described in steps S1108 and S1112).

The invention further involves control methods for a portable electronic device equipped with a camera module. Any technique using the aforementioned concept to capture image(s) and publish the captured image(s) online is within the scope of the invention.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A portable electronic device, comprising:
   a camera module;
   a shutter button for the camera module, switchable between multiple stages, wherein the shutter button includes a display screen; and
   a control circuit, operating the camera module and providing display content to the display screen based on the switch between the multiple stages of the shutter button,
   wherein:
   the multiple stages include a first stage for camera live preview on the display screen;
   the multiple stages further include a second stage for indicating the control circuit to operate the camera module for image capturing;
   the multiple stages further include a third stage for selectively displaying pictures or videos captured by the camera module on the display screen,
   the control circuit is further configured to select between different images shown on the display screen based on an operated status of the shutter button in the third stage;
   the shutter button further comprises a control dial around the display screen;
   the display screen switches between showing different images corresponding to the different pictures or videos captured by the camera module when the control dial is turned;
   the shutter button has a mechanical part supporting the display screen;
   mechanical motion of the control dial being turned is independent from mechanical motion of the mechanical part during the switch of the shutter button between the multiple stages;
   picture or video selection is confirmed when the mechanical part is half pressed;
   a half press on the mechanical part for the picture or video selection is shorter than a first threshold time; and
   in accordance with a half press on the mechanical part longer than the first threshold time when the shutter button is in the third stage, the camera module and the shutter button are operated for the camera live preview on the display screen again.

2. The portable electronic device as claimed in claim 1, further comprising:
   a wireless communication module, operated by the control circuit to publish the pictures or videos captured by the camera module online.

3. The portable electronic device as claimed in claim 2, wherein:
   the shutter button switched to the third stage is further operative to selectively display menu icons on the display screen.

4. The portable electronic device as claimed in claim 3, wherein: the control circuit is configured to:
   select between the different menu icons shown on the display screen based on an operated status of the shutter button in the third stage; and
   select an online social network based on the selected menu icon to publish a picture or video corresponding to the selected image.

5. The portable electronic device as claimed in claim 4, wherein:
   the display screen is further operative to be switched between showing the different menu icons corresponding to different online social networking services when the control dial is turned.

6. The portable electronic device as claimed in claim 5, wherein:
   online social network selection is confirmed when the mechanical part is half pressed.

7. The portable electronic device as claimed in claim 6, wherein:
   a half press on the mechanical part for the online social network selection is shorter than a second threshold time.

8. The portable electronic device as claimed in claim 1, wherein:
   during the camera live preview, the camera module takes a picture in accordance with a half press on the shutter button shorter than a third threshold time, and starts taking a video in accordance with a half press on the shutter button longer than the third threshold time.

9. A control method for a portable electronic device equipped with a camera module, comprising:
   providing a shutter button switchable between multiple stages on the portable electronic device for the camera module, wherein the shutter button includes a display screen;
   recognizing the switch between the multiple stages of the shutter button; and
   operating the camera module and providing display content to the display screen based on the switch between the multiple stages of the shutter button,
   wherein:
   the multiple stages include a first stage for camera live preview on the display screen;
   the multiple stages further include a second stage for operating the camera module for image capturing;
   the multiple stages further include a third stage for selectively displaying pictures or videos captured by the camera module on the display screen,
   the control method further comprises selecting between different images shown on the display screen based on an operated status of the shutter button in the third stage;
   the shutter button further comprises a control dial around the display screen;

the display screen is switched between showing different images corresponding to the different pictures or videos captured by the camera module by turning the control dial;

the shutter button has a mechanical part supporting the display screen;

mechanical motion of the control dial is independent from mechanical motion of the mechanical part;

picture or video selection is confirmed by a half press on the mechanical part;

a half press on the mechanical part for the picture or video selection is shorter than a first threshold time; and in accordance with a half press on the mechanical part longer than the first threshold time when the shutter button is in the third stage, the camera module and the shutter button are operated for the camera live preview on the display screen again.

10. The control method as claimed in claim 9, further comprising:

wirelessly publishing the pictures or videos captured by the camera module online.

11. The control method as claimed in claim 10, further comprising:

using the shutter button switched to the third stage to selectively display menu icons on the display screen.

12. The control method as claimed in claim 11, further comprising:

selecting between the different menu icons shown on the display screen based on an operated status of the shutter button in the third stage; and selecting an online social network based on the selected menu icon to publish a picture or video corresponding to the selected image.

13. The control method as claimed in claim 12, wherein:

the display screen is further switched between showing the different menu icons corresponding to different online social networking services by turning the control dial.

14. The control method as claimed in claim 13, wherein:

online social network selection is confirmed by a half press on the mechanical part.

15. The control method as claimed in claim 14, wherein:

a half press on the mechanical part for the online social network selection is shorter than a second threshold time.

16. The control method as claimed in claim 9, wherein:

during the camera live preview, the camera module takes a picture in accordance with a half press on the shutter button shorter than a third threshold time, and starts taking a video in accordance with a half press on the shutter button longer than the third threshold time.

* * * * *